US009264186B2

(12) United States Patent
Seol et al.

(10) Patent No.: US 9,264,186 B2
(45) Date of Patent: Feb. 16, 2016

(54) APPARATUS AND METHOD FOR CAPABILITY NEGOTIATION FOR HYBRID AUTOMATIC REPEAT REQUEST PARAMETER IN BROADBAND WIRELESS COMMUNICATION SYSTEM

(75) Inventors: Ji-Yun Seol, Seongnam-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 13/156,664

(22) Filed: Jun. 9, 2011

(65) Prior Publication Data

US 2011/0305214 A1 Dec. 15, 2011

(30) Foreign Application Priority Data

Jun. 9, 2010 (KR) ........................ 10-2010-0054525

(51) Int. Cl.
*H04L 1/18* (2006.01)
(52) U.S. Cl.
CPC ............ *H04L 1/1896* (2013.01); *H04L 1/1864* (2013.01)
(58) Field of Classification Search
CPC ................. H04L 1/1887; H04L 2001/0093; H04L 1/1864; H04W 72/005; H04W 4/06; H04W 72/042; H04W 4/08; H04W 28/06; H04W 4/005; H04W 52/0216; H04W 52/0219; H04W 68/02; H04W 76/002; H04W 76/06; H04W 92/18
USPC ............................ 370/254–340; 709/201–350
See application file for complete search history.

(56) References Cited

U.S. PATENT DOCUMENTS

| | | | | |
|---|---|---|---|---|
| 7,630,353 | B1* | 12/2009 | Erving et al. | 370/338 |
| 7,630,355 | B2* | 12/2009 | Tao et al. | 370/343 |
| 7,751,364 | B2* | 7/2010 | Won et al. | 370/329 |
| 2009/0323564 | A1* | 12/2009 | Chiu | 370/280 |
| 2010/0115124 | A1* | 5/2010 | Cai et al. | 709/236 |

OTHER PUBLICATIONS

IEEE Std 802.16e-2005 and IEEE Std 802.16-2004/Cor1-2005 (Amendment and Corrigendum to IEEE Std 802.16-2004) 3 Park Avenue New York, NY 10016-5997, USA , Feb. 28, 2006.*
IEEE Std and Revision of IEEE Std 802.16-2004 and consolidated material from IEEE Std 802.16e(f)-2005 IEEE Std 802.16g-2007 and IEEE Std 802.16/2004-Cor1-2005 (Amendment and Corrigendum to IEEE Std 802.16-2004) 3 Park Avenue New York, NY 10016-5997, USA , Jan. 2009.*
Part 16 : Air Interface for Broadband Wireless Access Systems, P802.16Rev2/D9 Jan. 2009.*

* cited by examiner

*Primary Examiner* — Ayaz Sheikh
*Assistant Examiner* — Debebe Asefa
(74) *Attorney, Agent, or Firm* — Jefferson IP Law, LLP

(57) ABSTRACT

A technique for supporting newly defined Hybrid Automatic Repeat reQuest (HARQ) categories without an occurrence of an interpretation error when using a legacy Mobile Station (MS) and a legacy Base Station (BS) in a broadband wireless communication system is provided. A method of transmitting a capability negotiation message includes determining an HARQ parameter set to be allocated, setting a value of a second field for informing whether to indicate an HARQ parameter set which corresponds to an index greater than a maximum value that can be indicated by using a first field for indicating an index of the HARQ parameter set, and transmitting the capability negotiation message including the second field.

32 Claims, 3 Drawing Sheets

APPARATUS AND METHOD FOR CAPABILITY NEGOTIATION FOR HYBRID AUTOMATIC REPEAT REQUEST PARAMETER IN BROADBAND WIRELESS COMMUNICATION SYSTEM

PRIORITY

This application claims the benefit under 35 U.S.C. §119 (a) of a Korean patent application filed in the Korean Intellectual Property Office on Jun. 9, 2010 and assigned Serial No. 10-2010-0054525, the entire disclosure of which is hereby incorporated by reference.

BACKGROUND OF THE INVENTION

1. Field of the Invention

The present invention relates to a broadband wireless communication system. More particularly, the present invention relates to an apparatus and method for performing capability negotiation for a Hybrid Automatic Repeat reQuest (HARQ) parameter in the broadband wireless communication system.

2. Description of the Related Art

A Hybrid Automatic Repeat reQuest (HARQ) scheme is employed to increase data transmission efficiency in a wireless communication system of the related art and a next generation wireless communication system such as 3rd Generation Partnership Project Long Term Evolution (3GPP LTE), Worldwide Interoperability for Microwave Access (WiMAX), etc. The HARQ scheme is proposed to correct a data error in a more rapid manner.

While the Automatic Repeat reQuest (ARQ) scheme of the related art determines whether to retransmit reception data by determining an error of data received in a software manner, the HARQ scheme determines whether to perform retransmission by determining the error of the reception data in a hardware manner. Therefore, a system employing the HARQ scheme can rapidly detect an error of received data. In addition, higher reception performance can be obtained by combining Log Likelihood Ratio (LLR) values of retransmission data and initially transmitted data.

In order to apply the HARQ scheme, the HARQ-related configuration parameters have to be pre-determined between a transmitter and a receiver. For example, the configuration parameters may include an uplink/downlink HARQ channel location, a signal binding scheme, a maximum number of retransmissions, etc. When each of the parameters is directly negotiated, a signaling overhead is increased according to the number of parameters. Accordingly, in order to decrease the signaling overhead, the transmitter and the receiver can define a specific number of parameter combinations, and can perform negotiation by using an index allocated to each combination. For example, an Institute of Electrical and Electronics Engineers (IEEE) 802.16e standard defines 5 parameter combinations in the name of an HARQ set.

The number of required HARQ sets may be increased as a system is enhanced. However, since the system is optimized for the support of the HARQ sets defined according to the related art, a newly added HARQ set cannot be indicated. If there is a value not used in a field for indicating the HARQ set and if a new HARQ set is indicated by using the unused value, then a transmitter and a receiver which recognize the new HARQ set can interpret the HARQ set without an error whereas such an error-free interpretation may not be possible when using the legacy transmitter and receiver. Therefore, the legacy transmitter and receiver may apply an incorrect HARQ parameter, or may face a situation where an access is denied.

Accordingly, there is a need for a method for indicating a newly defined HARQ set without an occurrence of an interpretation error when using the legacy transmitter and receiver.

SUMMARY OF THE INVENTION

Aspects of the present invention are to address at least the above-mentioned problems and/or disadvantages and to provide at least the advantages described below. Accordingly, an aspect of the present invention is to provide an apparatus and method for supporting newly defined Hybrid Automatic Repeat reQuest (HARQ) categories 5 and 6 without an occurrence of an interpretation error when using a legacy Mobile Station (MS) and a legacy Base Station (BS) in a broadband wireless communication system.

Another aspect of the present invention is to provide an apparatus and method for supporting newly defined HARQ categories 5 and 6 without additional overhead in a broadband wireless communication system.

In accordance with an aspect of the present invention, a method of transmitting a capability negotiation message in a broadband wireless communication system is provided. The method includes determining an HARQ parameter set to be allocated, setting a value of a second field for informing whether to indicate an HARQ parameter set which corresponds to an index greater than a maximum value that can be indicated in a first field for indicating an index of the HARQ parameter set, and transmitting the capability negotiation message including the second field.

In accordance with another aspect of the present invention, a method of receiving a capability negotiation message in a broadband wireless communication system is provided. The method includes receiving the capability negotiation message, determining a value of a second field for informing whether to indicate an HARQ parameter set which corresponds to an index greater than a maximum value that can be indicated in a first field for indicating an index of the HARQ parameter set, and determining whether the HARQ parameter set which corresponds to the index greater than the maximum value is indicated by using the value of the second field.

In accordance with another aspect of the present invention, an apparatus for transmitting a capability negotiation message in a broadband wireless communication system is provided. The apparatus includes a controller for determining an HARQ parameter set to be allocated and for setting a value of a second field for informing whether to indicate an HARQ parameter set which corresponds to an index greater than a maximum value that can be indicated in a first field for indicating an index of the HARQ parameter set, and a modem for transmitting the capability negotiation message including the second field.

In accordance with another aspect of the present invention, an apparatus for receiving a capability negotiation message in a broadband wireless communication system is provided. The apparatus includes a modem for receiving the capability negotiation message, and a controller for determining a value of a second field for informing whether to indicate an HARQ parameter set which corresponds to an index greater than a maximum value that can be indicated in a first field for indicating an index of the HARQ parameter set, and for determining whether the HARQ parameter set which corresponds to the index greater than the maximum value is indicated by using the value of the second field.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
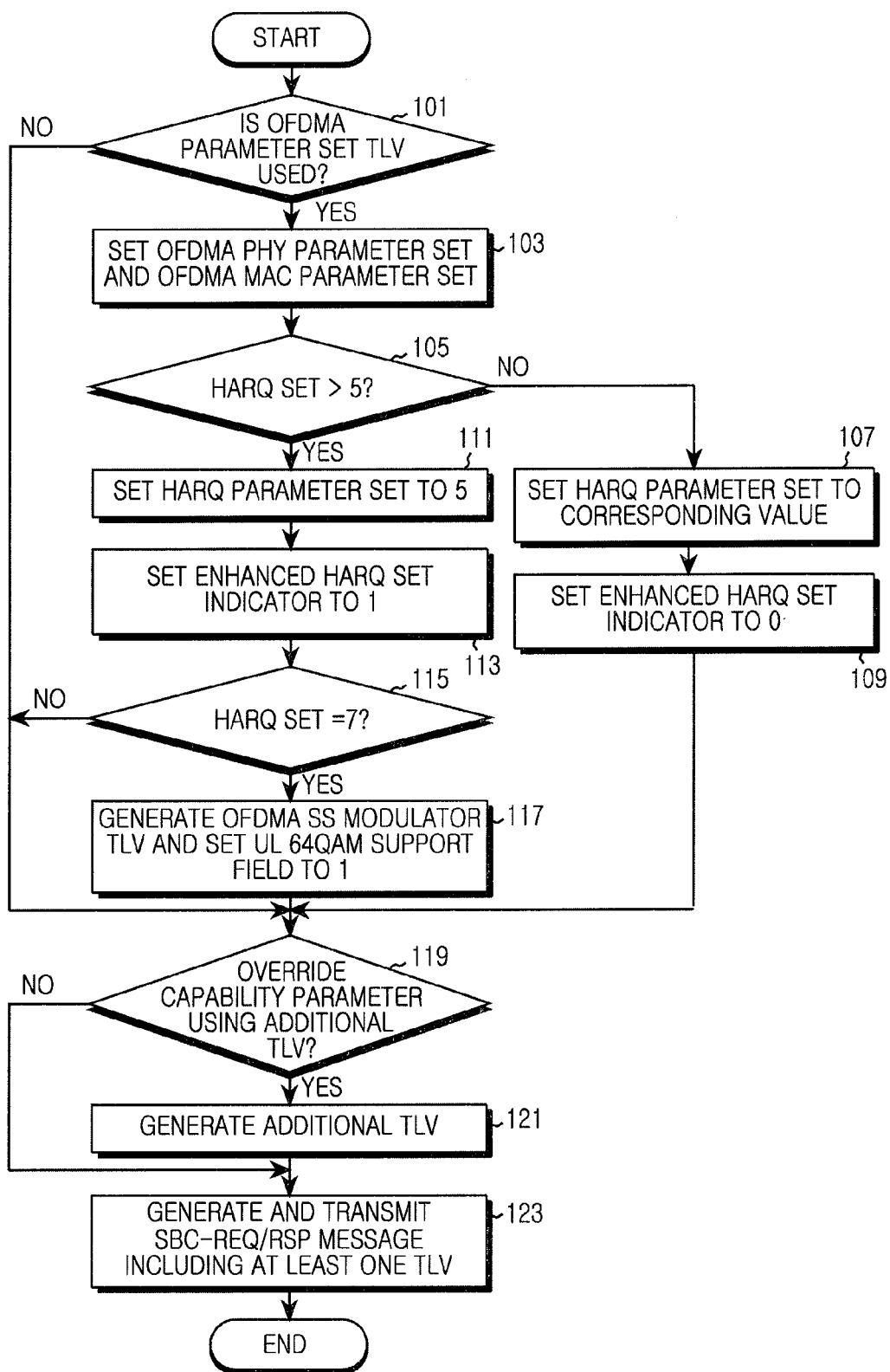
FIG. 1 is a flowchart illustrating a process of operating a transmitter for transmitting a capability negotiation message in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention described hereinafter relate to a technique for supporting newly defined Hybrid Automatic Repeat reQuest (HARQ) categories 5 and 6 without an occurrence of an interpretation error when using a legacy Mobile Station (MS) and a legacy Base Station (BS) in a broadband wireless communication system. Although an Orthogonal Frequency Division Multiplexing (OFDM)/Orthogonal Frequency Division Multiple Access (OFDMA)-type wireless communication system is described hereinafter as an example, the present invention can also be applied to other types of wireless communication systems.

For convenience of explanation, terminologies and names defined in an Institute of Electrical and Electronics Engineers (IEEE) 802.16m standard are used herein. However, the present invention is not limited to these terminologies and names, and can also be applied to systems conforming to other standards.

The following technique is proposed according to an exemplary embodiment of the present invention.

First, a method capable of indicating a newly added HARQ category without having an effect on a capability negotiation procedure of the legacy MS and BS is proposed. For example, the capability negotiation procedure can be referred to as a Subscribe station Basic Capability (SBC)-REQuest (REQ)/ReSPonse (RSP) procedure, and the HARQ category can be indicated by using an OFDMA parameter set Time, Length, and Value (TLV) included in the SBC-REQ/RSP message.

Second, a capability negotiation message generation procedure of an MS and a BS is proposed. In this case, the MS and the BS are capable of representing capability support for a newly added HARQ category by using parameter information included in the capability negotiation message. For example, the parameter information can be referred to as an 'OFDMA parameter set TLV', and the capability negotiation message can be referred to as an 'SBC-REQ/RSP message'.

Third, an operation procedure for interpreting an HARQ parameter set supported by an MS and a BS by using the parameter information included in the received capability negotiation message is proposed. Once again, the parameter information can be referred to as 'OFDMA parameter set TLV', and the capability negotiation message can be referred to as an 'SBC-REQ/RSP message'.

HARQ categories 1 to 4 defined in the Worldwide Interoperability for Microwave Access (WiMAX) Rel1.0/1.5 profile and recently added HARQ categories 5 and 6 are defined such that an HARQ buffer size is great when a category value is high. Therefore, a greater peak data rate can be supported. Accordingly, a BS or MS which supports a specific HARQ category can interpret such that a lower HARQ category can be supported automatically.

In addition, in a case of the newly added HARQ categories 5 and 6, DownLink (DL) HARQ parameters are identical, and there is a difference only in an UpLink (UL) HARQ buffer size. The newly added HARQ categories 5 and 6 have the configuration as illustrated in Table 1 and Table 2 below. HARQ sets 6 and 7 respectively correspond to the HARQ categories 5 and 6.

TABLE 1

| HARQ parameters | Items | Sub-items | References |
|---|---|---|---|
| HARQ set 6 | The number of UL HARQ channel | Number of UL HARQ channels = 10 | 11.8.3.5.3 |
| | The number of DL HARQ channel | Number of DL HARQ channels = 16 | 11.8.3.5.2 |
| | HARQ Chase combining and Chase Combining (CC) - Incremental Redundancy (IR) buffer | Downlink HARQ buffering capability for chase combining: K = 24 Aggregation Flag for DL = 1 (ON) Uplink HARQ | 11.8.3.5.17.2 |

TABLE 1-continued

| HARQ parameters | Items | Sub-items | References |
|---|---|---|---|
| | capability | buffering capability for chase combining: K = 20 Aggregation Flag for UL = 1 (ON) | |
| | Maximum number of burst per frame capability in HARQ | Maximum number of UL HARQ bursts per HARQ enabled MS per frame = 2 Indicates whether the maximum number of UL HARQ bursts per frame = not included Maximum number of DL HARQ bursts per HARQ enabled MS per frame = 5 | 11.8.3.5.13 |

TABLE 2

| HARQ parameters | Items | Sub-items | References |
|---|---|---|---|
| HARQ set 7 | The number of UL HARQ channel | Number of UL HARQ channels = 10 | 11.8.3.5.3 |
| | The number of DL HARQ channel | Number of DL HARQ channels = 16 | 11.8.3.5.2 |
| | HARQ Chase combining and CC-IR buffer capability | Downlink HARQ buffering capability for chase combining: K = 24 Aggregation Flag for DL = 1 (ON) Uplink HARQ buffering capability for chase combining: K = 22 Aggregation Flag for UL = 1 (ON) | 11.8.3.5.17.2 |
| | Maximum number of burst per frame capability in HARQ | Maximum number of UL HARQ bursts per HARQ enabled MS per frame = 2 Indicates whether the maximum number of UL HARQ bursts per frame = not included Maximum number of DL HARQ bursts per HARQ enabled MS per frame = 5 | 11.8.3.5.13 |

However, in a typical frame structure, e.g., in an environment where a bandwidth is 10 MHz and a Time Division Duplex (TDD) DL-UL ratio is 29:18, when an allocation resource is limited by a UL frame size and thus 16Quadrature Amplitude Modulation (QAM)-3/4 which is a maximum Modulation and Coding Scheme (MCS) level on a profile is supported in terms of a UL peak data rate, there is almost no difference between the HARQ categories 5 and 6. Therefore, there is no great gain.

If a UL maximum MCS level, i.e., 16QAM-3/4, is assumed, an ideal peak data rate is given as follows. In a case of the HARQ category 5, if it is assumed that an HARQ retransmission delay is 5 frames, 4.92 Megabit per second (Mbps) is possible in the aforementioned frame structure. In a case of the HARQ category 6, if it is assumed that the HARQ retransmission delay is 5 frames, up to 6.95 Mbps is possible in the aforementioned frame structure in an ideal case, but the peak data rate is limited to 5.04 Mbps in practice due to a limitation of a UL frame size.

As a result, in comparison with a case of using the HARQ category 5, if the HARQ category 6 is supported, there is no great gain unless UL 64QAM is supported. Therefore, in practice, the HARQ category 6 is effective only when the UL 64QAM is supported.

Exemplary embodiments of the present invention propose a method of SBC-REQ/RSP capability negotiation for the HARQ categories 5 and 6 newly added to the WiMAX Rel1.0/1.5 profile on the basis of the above descriptions.

First, a method of indicating the newly defined HARQ categories 5 and 6 by using the OFDMA parameter set TLV will be described.

According to a first exemplary embodiment of the present invention, an HARQ parameter set 6 (i.e., HARQ category 5) and an HARQ parameter set 7 (i.e., HARQ category 6) are expressed by using '0b101' and '0b110', respectively, which are reserved bits of a 3-bit value for representing an HARQ parameter set included in the existing OFDMA parameter set TLV. In this case, the OFDMA parameter set TLV is configured as illustrated in Table 3 below.

TABLE 3

| Type | Length (bytes) | Value | Scope |
|---|---|---|---|
| 204 | 1 | Bit 0: support OFDMA PHYsical (PHY) parameter set A Bit 1: support OFDMA PHY parameter set B Bit 2-4: HARQ parameters set 0b000: HARQ set 1 0b001: HARQ set 2 0b010: HARQ set 3 0b011: HARQ set 4 0b100: HARQ set 5 0b101: HARQ set 6 0b110: HARQ set 7 0b101-0b111: reserved Bit 5: support OFDMA Media Access Control (MAC) parameters set A Bit 6: support OFDMA MAC parameters set B Bit 7: reserved NOTE-Bit 0 and 1 shall not be set to 1 together. Bit 5 and 6 shall not be set to 1 together. | SBC-REQ SBC-RSP |

According to a second exemplary embodiment of the present invention, the HARQ categories 5 and 6 can be expressed by using a reserved 1 bit included in the existing OFDMA parameter set TLV. In addition, the HARQ category 6 is indicated together with a 64QAM capability bit included in modulation scheme information. For example, the modulation scheme information can be referred to as 'OFDMA SS modulator TLV', and the 64QAM capability field can be referred to as 'UL 64QAM capability'. In this case, the OFDMA parameter set TLV is configured as illustrated in Table 4 below. In addition, the OFDMA SS modulator TLV is configured as illustrated in Table 5 below.

TABLE 4

| Type | Length (bytes) | Value | Scope |
|---|---|---|---|
| 204 | 1 | Bit 0: support OFDMA PHY parameter set A Bit 1: support OFDMA PHY parameter set B Bit 2-4: HARQ parameters set 0b000: HARQ set 1 | SBC-REQ SBC-RSP |

TABLE 4-continued

| Type | Length (bytes) | Value | Scope |
|------|----------------|-------|-------|
|  |  | 0b001: HARQ set 2 |  |
|  |  | 0b010: HARQ set 3 |  |
|  |  | 0b011: HARQ set 4 |  |
|  |  | 0b100: HARQ set 5 |  |
|  |  | 0b101-0b111: reserved |  |
|  |  | Bit 5: support OFDMA MAC parameters set A |  |
|  |  | Bit 6: support OFDMA MAC parameters set B |  |
|  |  | Bit 7: Enhanced HARQ parameter set support indicator |  |
|  |  | if '0', HARQ parameter set as per Bit #2 to #4 |  |
|  |  | else |  |
|  |  | HARQ set 6 if UL 64-QAM not supported |  |
|  |  | HARQ set 7 if UL 64-QAM is supported |  |
|  |  | according to TLV Type 152 OFDMA SS modulator |  |
|  |  | NOTE-Bit 0 and 1 shall not be set to 1 together. Bit 5 and 6 shall not be set to 1 together. |  |

TABLE 5

| Type | Length | Value | Scope |
|------|--------|-------|-------|
| 152 | 1 | Bit0: 64-QAM | SBC-REQ (see 6.3.2.3.23) |
|  |  | Bit1: BTC |  |
|  |  | Bit2: CTC | SBC-RSP (see 6.3.2.3.24) |
|  |  | Bit3: STC |  |
|  |  | Bit4: HARQ chase |  |
|  |  | Bit5: CTC_IR |  |
|  |  | Bit6: CC_IR |  |
|  |  | Bit7: LDPC |  |

In a case of the first exemplary embodiment, if the legacy MS and the legacy BS do not support a newly modified OFDMA parameter set TLV, interpretation thereof may not be possible. Thus, it may be understood such that an incorrect HARQ parameter is supported, or there is a problem in that the MS and the BS cannot be accepted.

On the other hand, in a case of the second exemplary embodiment, the HARQ parameter set value informs whether the new HARQ category 5 or 6 is supported, by using a proposed "enhanced HARQ set indicator" value which is set to '0b100' corresponding to the HARQ category 4 (i.e., the HARQ parameter set 5). Therefore, the legacy MS and the legacy BS support the HARQ category 4 by ignoring an enhanced HARQ set indicator bit as a result of detecting only the HARQ parameter set value included in the OFDMA parameter set TLV in the received SBC-REQ/RSP message.

A process of configuring the SBC-REQ/RSP message by using the OFDMA parameter set TLV and the OFDMA SS modulator TLV when the new HARQ category 5 or 6 is supported will be described in further detail below.

When using the OFDMA parameter set TLV, the HARQ parameter set value is set according to a supported HARQ set. If the supported HARQ set is 1 to 5, a 3-bit value of the HARQ parameter set is set to a corresponding value, and a value of the enhanced HARQ set indicator is set to 0. If the supported HARQ set is 6 to 7, the OFDMA parameter set TLV is configured by setting the HARQ parameter set value to '0b100' corresponding to the HARQ set 5 and by setting the enhanced HARQ set indicator value to 1. If the additionally supported HARQ set is 7, UL 64QAM must be supported. To indicate this, a bit indicating the UL 64QAM support is set to 1 by using an OFDMA SS modulator TLV which is an additional capability TLV, and the OFDMA SS modulator TLV is transmitted together with the OFDMA parameter set TLV configured above.

An operation of obtaining an HARQ parameter set supported by an MS and a BS from an SBC-REQ/RSP message received by the MS and the BS which support the new HARQ category and the modified OFDMA parameter set TLV will be described in further detail below.

In a process such as initial network entry or handover, the SBC-REQ/RSP is exchanged to perform capability negotiation on the basis of capability supportable between the MS and the BS. In this case, the MS and the BS which support the new categories 5 and 6 and also support the proposed OFDMA parameter set TLV determine whether the new HARQ category 5 or 6 is supported by using an enhanced HARQ set indicator value.

Accordingly, the legacy MS and the legacy BS interpret a bit #7, i.e., the enhanced HARQ set indicator value, as a reserved bit and thus ignore the value. Therefore, since the HARQ category is understood as the HARQ category 4 with respect to a new MS and BS which set the OFDMA parameter set TLV, the HARQ category is automatically set to a value which is less than the new HARQ category 5 or 6 and which is the greatest among the existing HARQ categories.

Hereinafter, an operation and structure of an MS and a BS which operate as described above will be explained in further detail with reference to the accompanying drawings.

FIG. 1 is a flowchart illustrating a process of operating a transmitter for transmitting a capability negotiation message in a broadband wireless communication system according to an exemplary embodiment of the present invention. The capability negotiation message can be referred to as an 'SBC-REQ/RSP message'. The transmitter of FIG. 1 may be either a BS or an MS. In the procedure of FIG. 1, the BS transmits the SBC-RSP message when the MS transmits the SBC-REQ message.

Referring to FIG. 1, the transmitter determines whether parameter information, e.g., an OFDMA parameter set TLV, is used in step 101. If the OFDMA parameter set TLV is not used, then the procedure of FIG. 1 proceeds to step 119, which is described further below.

If the OFDMA parameter set TLV is used, proceeding to step 103, the transmitter sets values of an OFDMA PHY parameter set and an OFDMA MAC parameter set according to corresponding configuration information. The OFDMA PHY parameter set and the OFDMA MAC parameter set imply indices for pre-defined parameter combinations of a PHY layer and a MAC layer.

In step 105, the transmitter determines whether an index of a supported HARQ set is greater than 5.

If the index of the supported HARQ set is less than or equal to 5, proceeding to step 107, the transmitter sets the HARQ parameter set to a corresponding value, i.e., a value corresponding to the index of the supported HARQ set. In other words, the transmitter sets the HARQ parameter value to any one of values 1 to 5.

In step 109, the transmitter sets an enhanced HARQ set indicator to 0. Herein, the enhanced HARQ set indicator is a field for informing whether to indicate an added HARQ parameter set, i.e., an HARQ parameter set that corresponds to an index of 6 or higher. That is, the transmitter sets the enhanced HARQ set indicator to 0 so that a receiver is informed that the HARQ set index is less than or equal to 5.

If the index of the supported HARQ set is greater than 5 in step 105, in other words, if the index of the supported HARQ set is 6 or 7, proceeding to step 111, the transmitter sets the HARQ parameter set to 5. That is, the transmitter sets a value of the HARQ parameter set to a maximum value so that there is no interpretation error occurring in the legacy MS and the legacy BS.

In step 113, the transmitter sets the enhanced HARQ set indicator to 1. That is, the transmitter sets the enhanced HARQ set indicator to 1 so that the receiver is informed that the index of the HARQ set is greater than 5.

In step 115, the transmitter determines whether the index of the supported HARQ set is 7. If the index of the supported HARQ set is not 7, that is, if the index is 6, then procedure of FIG. 1 proceeds to step 119.

Otherwise, if the index of the supported HARQ set is 7, proceeding to step 117, the transmitter generates modulation scheme information, e.g., an OFDMA SS modulator TLV, and sets a UL 64QAM support field included in the OFDMA SS modulator TLV to 1. That is, the transmitter sets the UL 64QAM support field to 1 in order to indicate that the index of the supported HARQ set is 7.

In step 119, the transmitter determines whether to override a capability parameter using an additional TLV. That is, the transmitter determines whether to use the additional TLV for replacing or specifying some of capability parameters expressed by using the OFDMA parameter set TLV.

If the additional TLV is to be used, proceeding to step 121, the transmitter generates the additional TLV.

In step 123, the transmitter generates and transmits a capability negotiation message (e.g., an SBC-REQ/RSP message) including at least one TLV. In this case, if the transmitter is the MS, the transmitter generates and transmits the SBC-REQ message, and if the transmitter is the BS, the transmitter generates and transmits the SBC-RSP message.

Figure 2:
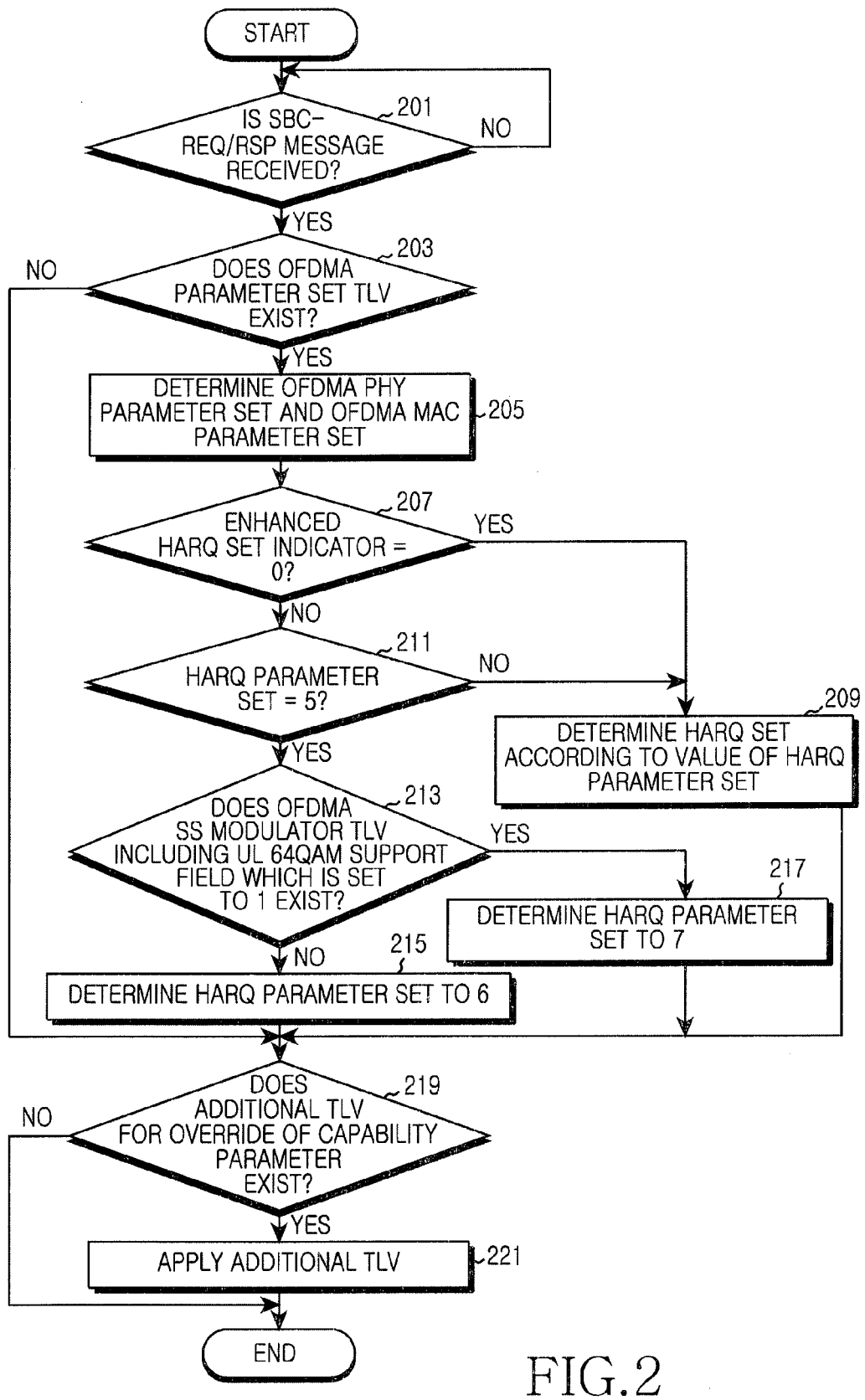
FIG. 2 is a flowchart illustrating a process of operating a receiver for receiving a capability negotiation message in a broadband wireless communication system according to an exemplary embodiment of the present invention.

FIG. 2 is a flowchart illustrating a process of operating a receiver for receiving a capability negotiation message in a broadband wireless communication system according to an exemplary embodiment of the present invention. The capability negotiation message can be referred to as an 'SBC-REQ/RSP message'. The receiver of FIG. 2 may be either a BS or an MS. In the procedure of FIG. 2, the BS receives the SBC-REQ message whereas the MS receives the SBC-RSP message.

Referring to FIG. 2, the receiver determines whether a capability negotiation message, e.g., an SBC-REQ/RSP message, is received in step 201. In this case, if the receiver is the MS, the receiver receives the SBC-RSP message, and if the receiver is the BS, the receiver receives the SBC-REQ message. The receiver repeats step 201 until the capability negotiation message is received.

If the SBC-REQ/RSP message is received, proceeding to step 203, the receiver determines whether parameter information (e.g., an OFDMA parameter set TLV) exists in the SBC-REQ/RSP message. If the OFDMA parameter set TLV does not exist, then the procedure of FIG. 2 proceeds to step 219, which is described further below.

If the OFDMA parameter set TLV exists, proceeding to step 205, the receiver determines values of an OFDMA PHY parameter set and an OFDMA MAC parameter set included in the OFDMA parameter set TLV. The OFDMA PHY parameter set and the OFDMA MAC parameter set imply indices for pre-defined parameter combinations of a PHY layer and a MAC layer.

In step 207, the receiver determines whether an enhanced HARQ set indicator is set to 0. In other words, the receiver determines whether an HARQ set supported in the transmitter is 6 or 7.

If the enhanced HARQ set indicator is 0, proceeding to step 209, the receiver recognizes that an index of the HARQ set supported in the transmitter is less than or equal to 5, determines the HARQ set to be applied according to a value of an HARQ parameter set, and then proceeds to step 219.

Otherwise, if the enhanced HARQ set indicator is not 0, that is, if it is 1, proceeding to step 211, the receiver determines whether the HARQ parameter set is set to 5. If the HARQ parameter set is not set to 5, the procedure of FIG. 2 proceeds to step 209.

Otherwise, if the HARQ parameter set is set to 5, proceeding to step 213, the receiver determines whether there is an OFDMA SS modulator TLV including a UL 64QAM support field which is set to 1. That is, the receiver determines whether the index of the HARQ set supported by the transmitter is 7.

If there is no OFDMA SS modulator TLV including the UL 64QAM support field which is set to 1, proceeding to step 215, the receiver determines a value of the HARQ parameter set to be applied to 6. That is, if the receiver is the MS, the receiver determines the index of the HARQ set to be used to 6. Otherwise, if the receiver is the BS, the receiver determines an index of a maximum allowable HARQ set to 6. Herein, a case where there is no OFDMA SS modulator TLV including the UL 64QAM support field which is set to 1 includes a case where the OFDMA SS modulator TLV exists but the UL 64QAM support field is 0 and a case where the OFDMA SS modulator TLV does not exist. In this case, according to another exemplary embodiment of the present invention, the procedure of FIG. 2 may proceed to step 209 in any one of the case where the OFDMA SS modulator TLV exists but the UL 64QAM support field is 0 and the case where the OFDMA SS modulator TLV does not exist, and otherwise may proceed to step 215.

On the other hand, if there is the OFDMA SS modulator TLV including the UL 64QAM support field which is set to 1, proceeding to step 217, the receiver determines a value of the HARQ parameter set to be applied to 7. That is, if the receiver is the MS, the receiver determines an index of an HARQ set to be used to 7. Otherwise, if the receiver is the BS, the receiver determines an index of a maximum allowable HARQ set to 7. Thereafter, the receiver proceeds to step 219.

In step 219, the receiver determines whether there is an additional TLV for an override of the capability parameter. That is, the receiver determines whether there is the additional TLV for replacing or specifying some of capability parameters expressed by using the OFDMA parameter set TLV.

If the additional TLV exists, proceeding to step 221, the receiver applies the capability parameter.

Figure 3:
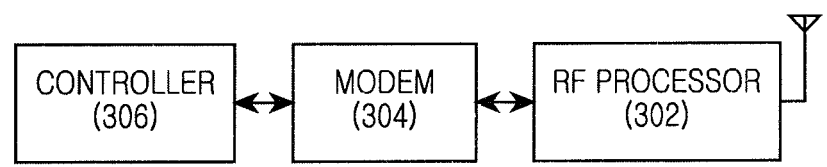
FIG. 3 is a block diagram of a Mobile Station (MS) and a Base Station (BS) in a broadband wireless communication system according to an exemplary embodiment of the present invention.

FIG. 3 is a block diagram of an MS and a BS in a broadband wireless communication system according to an exemplary embodiment of the present invention.

Referring to FIG. 3, the MS and the BS each include a Radio Frequency (RF) processor 302, a modem 304, and a controller 306.

The RF processor 302 performs a function of transmitting and receiving a signal through a radio channel, such as a function of signal band conversion, amplification, or the like. That is, the RF processor 302 up-converts a baseband signal provided from the modem 304 into an RF band signal and then transmits the RF band signal through an antenna, and down-converts the RF band signal received through the antenna into a baseband signal.

The modem 304 performs a function of conversion between the baseband signal and a bit-stream according to a PHY layer protocol of the system. For example, in data transmission, the modem 304 generates complex symbols by performing coding and modulation on a Transmit (Tx) bit-stream, maps the complex symbols to subcarriers, and configures OFDM symbols by performing an Inverse Fast Fourier Transform (IFFT) operation and inserting a Cyclic Prefix (CP). Further, in data reception, the modem 304 divides the baseband signal provided from the RF processor 302 on an OFDM symbol basis, restores signals mapped to subcarriers by performing a Fast Fourier Transform (FFT) operation, and then restores a Receive (Rx) bit-stream by performing demodulation and decoding.

The controller 306 controls overall functions of the MS or the BS. For example, the controller 306 generates a MAC management message, traffic burst, etc., interprets a received MAC management message, and processes traffic. More particularly, according to the exemplary embodiment of the present invention, the controller 306 generates an SBC-REQ/RSP message as illustrated in FIG. 1, and interprets the received SBC-REQ/RSP message as illustrated in FIG. 2.

According to exemplary embodiments of the present invention, a newly added HARQ category can be supported without an additional overhead in a broadband wireless communication system. In addition, a legacy MS and a legacy BS which do not support the new HARQ category interpret the new HARQ category as an existing HARQ category, and thus a maximum supportable HARQ parameter can be applied without having an effect on an MS and a BS which support the new HARQ category.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a transmitting node in a wireless communication system, the method comprising:
    generating a message comprising a first information and a second information; and
    transmitting the message,
    wherein the first information indicates an index corresponding to one of a plurality of first control parameter sets for a basic communication mode,
    wherein the second information indicates whether at least one second control parameter set for an enhanced communication mode is supported by the transmitting node,
    wherein, if the second information indicates that the at least one second control parameter set for the enhanced communication mode is not supported by the transmitting node, the first information is interpreted as indicating one of the plurality of first control parameter sets for the basic communication mode, and
    wherein, if the second information indicates that the at least one second control parameter set for the enhanced communication mode is supported by the transmitting node, the first information is not interpreted as indicating one of the plurality of first control parameter sets for the basic communication mode, and the first information and the second information are interpreted as indicating a second control parameter set for the enhanced communication mode.

2. The method of claim 1, further comprising:
    determining a control parameter set to be applied.

3. The method of claim 1, wherein the first information comprises a maximum index among indices of the basic communication mode, when the second information indicates that the at least one second control parameter set for the enhanced communication mode is supported by the transmitting node.

4. The method of claim 3, further comprising:
    transmitting a third information informing whether to support 64 Quadrature Amplitude Modulation (QAM) in order to identify one of a plurality of control parameter sets which correspond to an index greater than the maximum index for the first information.

5. The method of claim 1, wherein the second control parameter set defines the number of UpLink (UL) HARQ channels to 10, the number of DownLink (DL) HARQ channels to 16, a variable K that indicates DL HARQ buffering capability for Chase Combining (CC) to 24, an aggregation flag for DL to 'on', a variable K that indicates UL HARQ buffering capability for CC to 20, an aggregation flag for DL to 'on', a maximum number of UL HARQ bursts per HARQ enabled Mobile Station (MS) per frame to 2, and the maximum number of UL HARQ bursts per HARQ enabled MS per frame to 5.

6. The method of claim 1, wherein the second control parameter set defines the number of UpLink (UL) HARQ channels to 10, the number of DownLink (DL) HARQ channels to 16, a variable K that indicates DL HARQ buffering capability for Chase Combining (CC) to 24, an aggregation flag for DL to 'on', a variable K that indicates UL HARQ buffering capability for CC to 22, an aggregation flag for DL to 'on', a maximum number of UL HARQ bursts per HARQ enabled Mobile Station (MS) per frame to 2, and the maximum number of UL HARQ bursts per HARQ enabled MS per frame to 5.

7. The method of claim 1, wherein the control parameter set comprises a Hybrid Automatic Repeat reQuest (HARQ) parameter set.

8. The method of claim 1, wherein the second parameter set indicates a larger uplink buffer than the first parameter set.

9. An apparatus for a transmitting node in a wireless communication system, the apparatus comprising:
    a controller configured to control to generate a message comprising a first information and a second information; and
    a transmitter configured to transmit the message,
    wherein the first information indicates an index corresponding to one of a plurality of first control parameter sets for a basic communication mode,
    wherein the second information indicates whether at least one second control parameter set for an enhanced communication mode is supported by the transmitting node,
    wherein, if the second information indicates that the at least one second control parameter set for the enhanced communication mode is not supported by the transmitting node, the first information is interpreted as indicating one of the plurality of first control parameter sets for the basic communication mode, and
    wherein, if the second information indicates that the at least one second control parameter set for the enhanced communication mode is supported by the transmitting node, the first information is not interpreted as indicating one of the plurality of first control parameter sets for the basic communication mode, and the first information and the second information are interpreted as indicating a second control parameter set for the enhanced communication mode.

10. The apparatus of claim 9, further comprising:
    a controller configured to determine a control parameter set to be applied.

11. The apparatus of claim 9, wherein the first information comprises a maximum index among indices of the basic communication mode, when the second information indicates that the at least one second control parameter set for the enhanced communication mode is supported by the transmitting node.

12. The apparatus of claim 11, wherein the transmitter is further configured to transmit a third information informing whether to support 64 Quadrature Amplitude Modulation (QAM) in order to identify one of a plurality of control parameters sets which correspond to an index greater than the maximum index for the first information.

13. The apparatus of claim 9, wherein the second control parameter set defines the number of UpLink (UL) HARQ channels to 10, the number of DownLink (DL) HARQ channels to 16, a variable K that indicates DL HARQ buffering capability for Chase Combining (CC) to 24, an aggregation flag for DL to 'on', a variable K that indicates UL HARQ buffering capability for CC to 20, an aggregation flag for DL to 'on', a maximum number of UL HARQ bursts per HARQ enabled Mobile Station (MS) per frame to 2, and the maximum number of UL HARQ bursts per HARQ enabled MS per frame to 5.

14. The apparatus of claim 9, wherein the second control parameter set defines the number of UpLink (UL) HARQ channels to 10, the number of DownLink (DL) HARQ channels to 16, a variable K that indicates DL HARQ buffering capability for Chase Combining (CC) to 24, an aggregation flag for DL to 'on', a variable K that indicates UL HARQ buffering capability for CC to 22, an aggregation flag for DL to 'on', a maximum number of UL HARQ bursts per HARQ enabled Mobile Station (MS) per frame to 2, and the maximum number of UL HARQ bursts per HARQ enabled MS per frame to 5.

15. The apparatus of claim 9, wherein the control parameter set comprises a Hybrid Automatic Repeat reQuest (HARQ) parameter set.

16. The apparatus of claim 9, wherein the second parameter set indicates a larger uplink buffer than the first parameter set.

17. A method for operating a receiving node in a wireless communication system, the method comprising:
receiving a message comprising a first information and a second information from a transmitting node,
wherein the first information indicates an index corresponding to first control parameter sets for a basic communication mode,
wherein the second information indicates whether at least one second control parameter set for an enhanced communication mode is supported by the transmitting node,
wherein, if the second information indicates that the at least one second control parameter set for the enhanced communication mode is not supported by the transmitting node, the first information is interpreted as indicating one of the plurality of first control parameter sets for the basic communication mode, and
wherein, if the second information indicates that the at least one second control parameter set for the enhanced communication mode is supported by the transmitting node, the first information is not interpreted as indicating one of the plurality of first control parameter sets for the basic communication mode, and the first information and the second information are interpreted as indicating a second control parameter set for the enhanced communication mode.

18. The method of claim 17, further comprising:
determining that the second control parameter set is supported by the transmitting node, based on the first information and the second information.

19. The method of claim 17, wherein the first information comprises a maximum index among indices of the basic communication mode, when the second information indicates that the at least one second control parameter set for an enhanced communication mode is supported by the transmitting node.

20. The method of claim 19, further comprising:
receiving a third information informing whether to support 64 Quadrature Amplitude Modulation (QAM) in order to identify one of a plurality of control parameter sets which correspond to an index greater than the maximum index for the first information.

21. The method of claim 17, wherein the second control parameter set defines the number of UpLink (UL) HARQ channels to 10, the number of DownLink (DL) HARQ channels to 16, a variable K that indicates DL HARQ buffering capability for Chase Combining (CC) to 24, an aggregation flag for DL to 'on', a variable K that indicates UL HARQ buffering capability for CC to 20, an aggregation flag for DL to 'on', a maximum number of UL HARQ bursts per HARQ enabled Mobile Station (MS) per frame to 2, and the maximum number of UL HARQ bursts per HARQ enabled MS per frame to 5.

22. The method of claim 17, wherein the second control parameter set defines the number of UpLink (UL) HARQ channels to 10, the number of DownLink (DL) HARQ channels to 16, a variable K that indicates DL HARQ buffering capability for Chase Combining (CC) to 24, an aggregation flag for DL to 'on', a variable K that indicates UL HARQ buffering capability for CC to 22, an aggregation flag for DL to 'on', a maximum number of UL HARQ bursts per HARQ enabled Mobile Station (MS) per frame to 2, and the maximum number of UL HARQ bursts per HARQ enabled MS per frame to 5.

23. The method of claim 17, wherein the control parameter set comprises a Hybrid Automatic Repeat reQuest (HARQ) parameter set.

24. The method of claim 17, wherein the second parameter set indicates a larger uplink buffer than the first parameter set.

25. An apparatus for a receiving node in a wireless communication system, the apparatus comprising:
a receiver configured to receive a message comprising a first information and a second information from a transmitting node,
wherein the first information indicates an index corresponding to one of a plurality of a first control parameter sets for a basic communication mode,
wherein the second information indicates whether at least one second control parameter set for an enhanced communication mode is supported by the transmitting node,
wherein, if the second information indicates that the at least one second control parameter set for the enhanced communication mode is not supported by the transmitting node, the first information is interpreted as indicating one of the plurality of first control parameter sets for the basic communication mode, and
wherein, if the second information indicates that the at least one second control parameter set for the enhanced communication mode is supported by the transmitting node, the first information is not interpreted as indicating one of the plurality of first control parameter sets for the basic communication mode, and the first information and the second information are interpreted as indicating a second control parameter set for the enhanced communication mode.

26. The apparatus of claim 25, further comprising:
a controller configured to determine that the second control parameter set is supported by the transmitting node, based on the first information and the second information.

27. The apparatus of claim 25, wherein the first information comprises a maximum index among indices of the basic communication mode, when the second information indicates that the at least one second control parameter set for an enhanced communication mode is supported by the transmitting node.

28. The apparatus of claim 27, wherein the receiver is configured to receive a third information informing whether to support 64 Quadrature Amplitude Modulation (QAM) in order to identify one of a plurality of control parameter sets which correspond to an index greater than the maximum index for the first information.

29. The apparatus of claim 26, wherein the second control parameter set defines the number of UpLink (UL) HARQ channels to 10, the number of DownLink (DL) HARQ channels to 16, a variable K that indicates DL HARQ buffering capability for Chase Combining (CC) to 24, an aggregation flag for DL to 'on', a variable K that indicates UL HARQ buffering capability for CC to 20, an aggregation flag for DL to 'on', a maximum number of UL HARQ bursts per HARQ enabled Mobile Station (MS) per frame to 2, and the maximum number of UL HARQ bursts per HARQ enabled MS per frame to 5.

30. The apparatus of claim 26, wherein the second control parameter set defines the number of UpLink (UL) HARQ channels to 10, the number of DownLink (DL) HARQ channels to 16, a variable K that indicates DL HARQ buffering capability for Chase Combining (CC) to 24, an aggregation flag for DL to 'on', a variable K that indicates UL HARQ buffering capability for CC to 22, an aggregation flag for DL to 'on', a maximum number of UL HARQ bursts per HARQ enabled Mobile Station (MS) per frame to 2, and the maximum number of UL HARQ bursts per HARQ enabled MS per frame to 5.

31. The apparatus of claim 25, wherein the control parameter set comprises a Hybrid Automatic Repeat reQuest (HARQ) parameter set.

32. The apparatus of claim 25, wherein the second parameter set indicates a larger uplink buffer than the first parameter set.

* * * * *